US008646063B2

(12) United States Patent
Dowlatkhah

(10) Patent No.: US 8,646,063 B2
(45) Date of Patent: *Feb. 4, 2014

(54) METHODS, APPARATUS, AND COMPUTER PROGRAM PRODUCTS FOR SUBSCRIBER AUTHENTICATION AND TEMPORARY CODE GENERATION

(71) Applicant: AT&T Intellectual Property I, L.P., Atlanta, GA (US)

(72) Inventor: Sangar Dowlatkhah, Alpharetta, GA (US)

(73) Assignee: AT&T Mobility II, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/716,868

(22) Filed: Dec. 17, 2012

(65) Prior Publication Data

US 2013/0160097 A1 Jun. 20, 2013

Related U.S. Application Data

(63) Continuation of application No. 12/550,947, filed on Aug. 31, 2009, now Pat. No. 8,375,432.

(51) Int. Cl.
*H04L 9/32* (2006.01)
*G06F 21/00* (2013.01)

(52) U.S. Cl.
USPC .................................... 726/10; 726/5; 726/6

(58) Field of Classification Search
USPC .................................................. 726/5, 6, 10
See application file for complete search history.

(56) References Cited

U.S. PATENT DOCUMENTS

| 2001/0044894 | A1* | 11/2001 | Saito et al. ..................... 713/156 |
| 2004/0078571 | A1 | 4/2004 | Haverinen |
| 2004/0153667 | A1 | 8/2004 | Kastelewicz et al. |
| 2006/0073811 | A1 | 4/2006 | Ekberg |
| 2006/0235796 | A1 | 10/2006 | Johnson et al. |
| 2007/0167151 | A1 | 7/2007 | Zinn et al. |
| 2007/0169175 | A1 | 7/2007 | Hall et al. |
| 2007/0220598 | A1 | 9/2007 | Salowey et al. |
| 2008/0034216 | A1* | 2/2008 | Law ............................. 713/183 |
| 2008/0134347 | A1 | 6/2008 | Goyal et al. |
| 2008/0178004 | A1 | 7/2008 | Wei et al. |
| 2009/0150989 | A1 | 6/2009 | Hoey et al. |

* cited by examiner

*Primary Examiner* — Jung Kim
*Assistant Examiner* — Theodore Parsons
(74) *Attorney, Agent, or Firm* — Cantor Colburn LLP

(57) ABSTRACT

A mechanism is provided for providing temporary generated codes by a server. Responsive to triplet authentication of a device to service provider network, a server receives an initial code from the device to request a temporary generated code. The server verifies the triplet authentication of device. The server determines whether there is a user account match to the initial code. The server determines a corresponding application server based on the initial code and the user account match. The server generates a temporary generated code to access the application server. The temporary generated code is transmitted to both the application server and the communication device, is set to expire at a preset time, is generated to allow the user access to a single session on the application server, and is generated to expire after the temporary generated code is input to access the single session on application server.

20 Claims, 6 Drawing Sheets

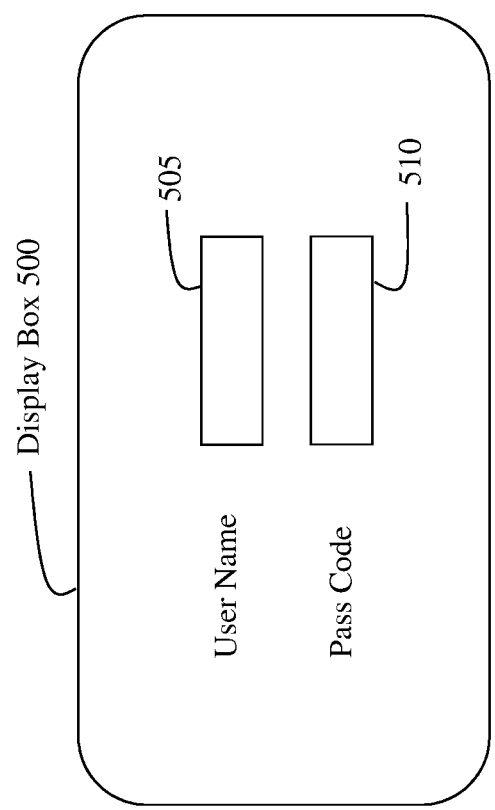

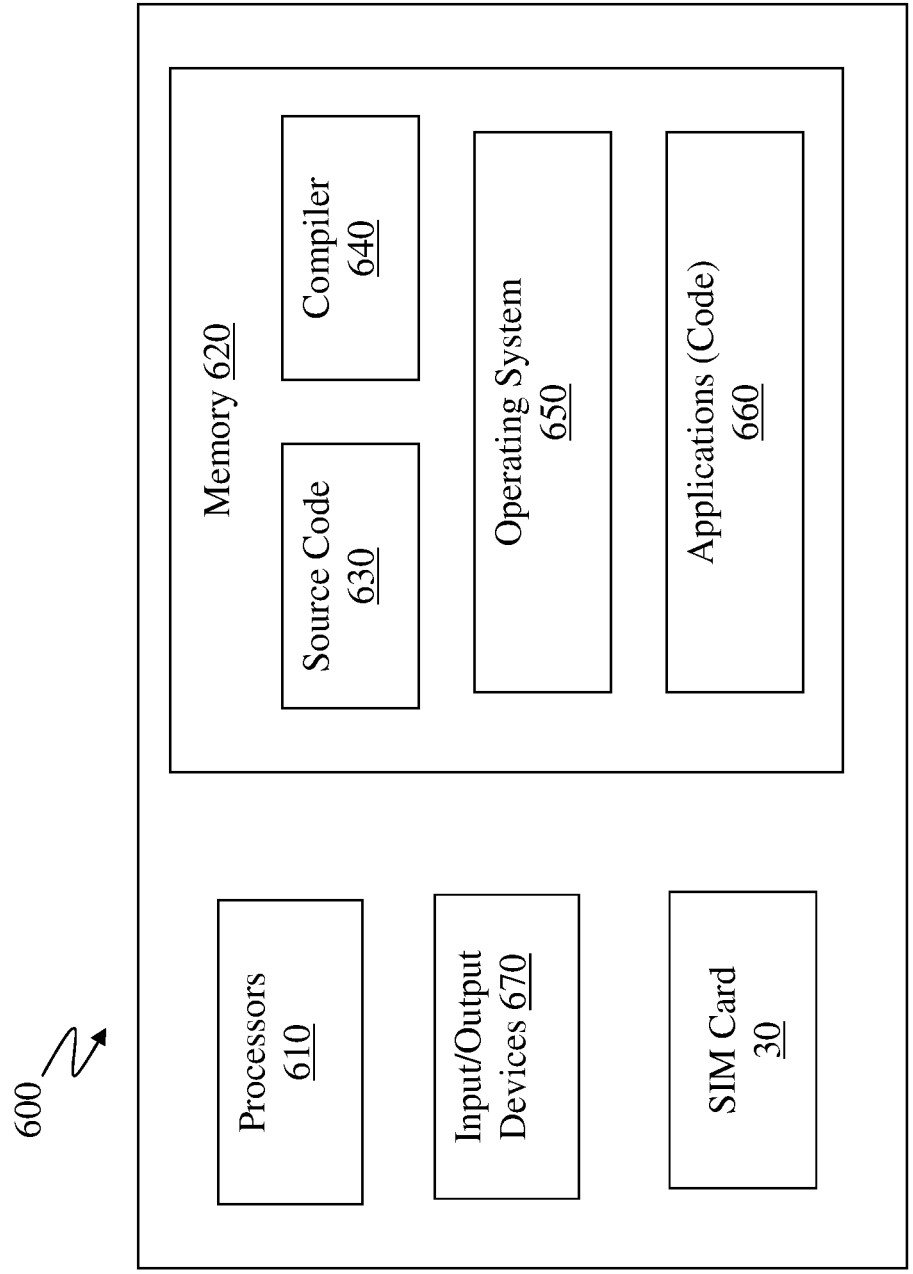

METHODS, APPARATUS, AND COMPUTER PROGRAM PRODUCTS FOR SUBSCRIBER AUTHENTICATION AND TEMPORARY CODE GENERATION

CROSS-REFERENCE TO RELATED APPLICATIONS AND PRIORITY CLAIM

This application is a continuation of U.S. Non-Provisional application Ser. No. 12/550,947, entitled "METHODS, APPARATUS, AND COMPUTER PROGRAM PRODUCTS FOR SUBSCRIBER AUTHENTICATION AND TEMPORARY CODE GENERATION", filed Aug. 31, 2009, which is incorporated herein by reference in its entirety.

BACKGROUND

Exemplary embodiments relate to, but are not limited to, subscriber authentication and temporary code generation for gaining access to restricted computer systems.

Users daily access many portals with communication devices, such as smart phones, computers, etc. A computer system may have confidential applications and data stored in the system's memory. To prevent unauthorized access, most computer systems only employ a username and a password. Thus, a person who wishes to steal confidential information from a computer system would only need the owner's username and password to gain access. A variety of unscrupulous methods exist to steal or alter the username and password for malicious intent. Additional levels of protection would help to prevent theft of confidential information of a computer system.

BRIEF SUMMARY

Exemplary embodiments include a method for providing temporary generated codes by a portal authentication server for portal authentication. In response to triplet authentication of a communication device to a service provider network for communications, a portal authentication server receives an initial code from a user utilizing the communication device to request a temporary generated code. The portal authentication server verifies the triplet authentication of the communication device to the service provider network plus the initial authorized code (personal code) agreed by the user and computer system e.g. bank portal. In response to proper verification, the portal authentication server determines whether there is a user account match to the initial code from the user. In response to determining the user account match, the portal authentication server determines a corresponding application server based on the initial code and the user account match. In response to the user account match and determining the application server e.g. bank Portal, the portal authentication server generates a temporary generated code to access the application server. The portal authentication server transmits the temporary generated code to both the application server and the communication device. The temporary generated code is set to expire at a preset time. The temporary generated code is generated to allow the user access to a single session on the application server. The temporary generated code is generated to expire after the temporary generated code is input to access the single session on the application server.

Other systems, methods, apparatus, and/or computer program products according to embodiments will be or become apparent to one with skill in the art upon review of the following drawings and detailed description. It is intended that all such additional systems, methods, apparatus, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES:

FIG. 5 illustrates a display box utilized in accordance with exemplary embodiments; and FIG. 6 illustrates an example of a computer having elements utilized in implementing exemplary embodiments.

The detailed description explains exemplary embodiments, together with features, by way of example with reference to the drawings.

DETAILED DESCRIPTION OF EXEMPLARY EMBODIMENTS

In the following detailed description, numerous specific details are set forth in order to provide a thorough understanding of the invention. However, it will be understood by those skilled in the art that the present disclosure may be practiced without these specific details. In other instances, well-known methods, procedures, components and circuits have not been described in detail so as not to obscure the present disclosure.

Figure 1:
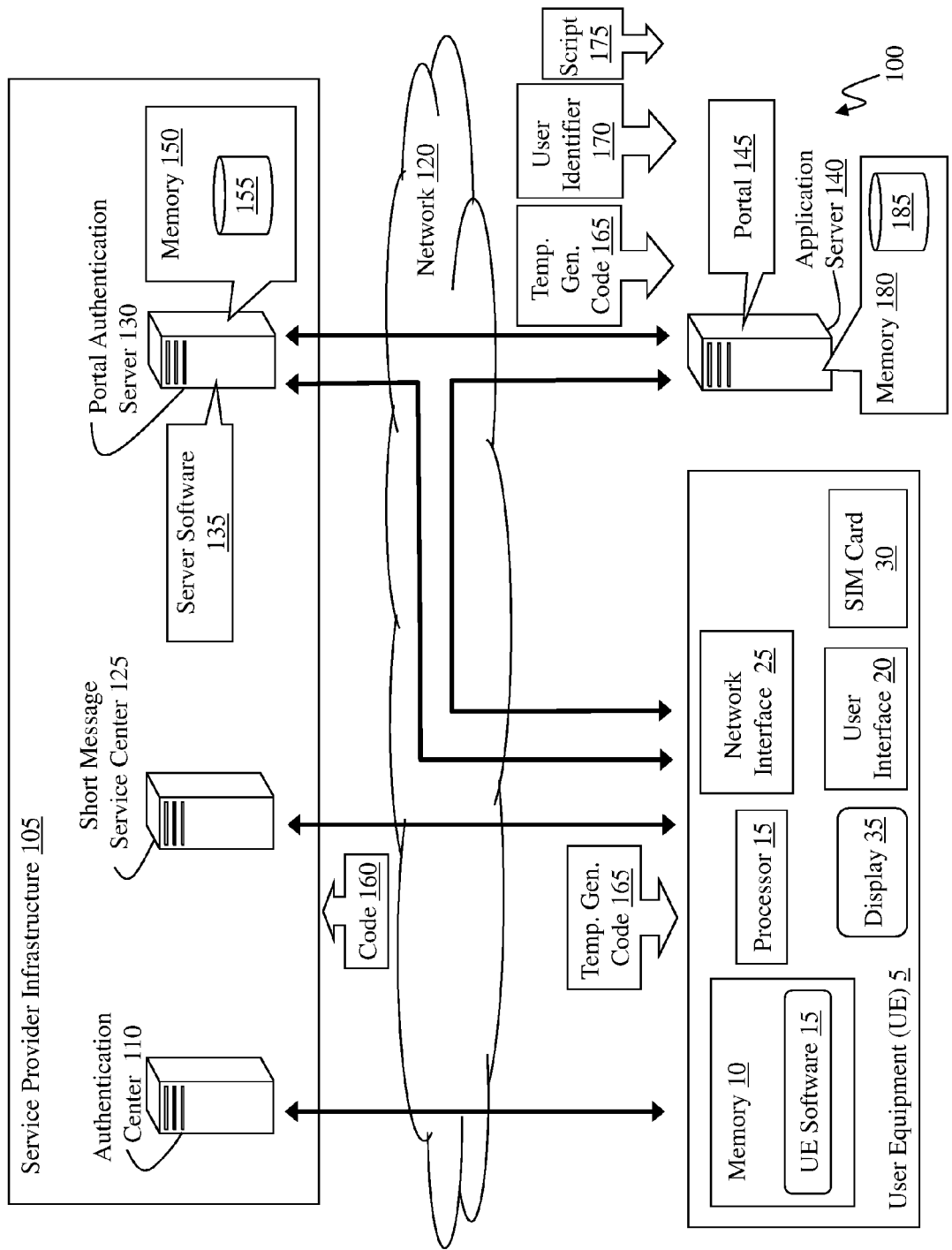
FIG. 1 illustrates a block diagram in accordance with exemplary embodiments.

FIG. 1 illustrates a block diagram 100 in accordance with exemplary embodiments. The block diagram 100 illustrates user equipment (UE) which is a communication device such as a smart phone, mobile device, personal digital assistant (PDA), set top box, cell phone, computer, etc.

Figure 4:
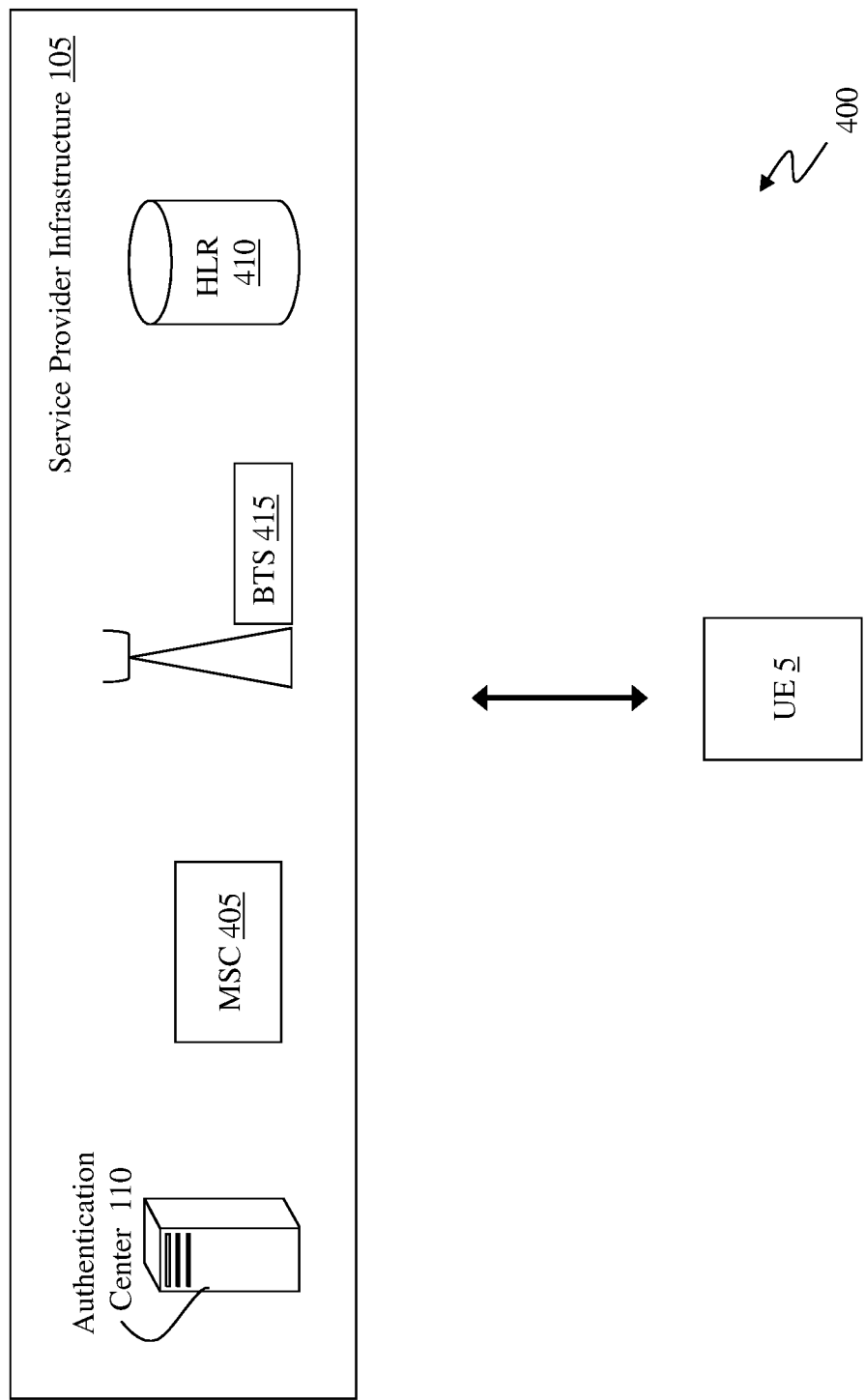
FIG. 4 illustrates a block diagram of triplet authentication utilized in exemplary embodiments.

The user of the UE 5 may desire to utilize the wireless services of a service provider infrastructure 105, such as for example AT&T's® MOBILITY Infrastructure. The UE 5 is configured to go through an authentication process, such as triplet authentication, to be authenticated by the authentication center 110 to the service provider infrastructure 105. Refer to FIG. 4 for further details regarding the triplet authentication process. It is understood that other authentication processes may be executed to utilize the service provider infrastructure 105, and the triplet authentication process is only used for explanatory purpose.

In response to the user being authenticated by the service provider infrastructure 105 via the authentication center 110, the user may input an initial authorization code 160, e.g., a 4 digit code, via the user interface 20 and user software 15. The user interface 20 may be a keyboard interface, a mouse, a touch screen, etc., for inputting the code 160 and operating the UE 5. The user software 15 is configured to control the operations of the UE 5. The user may input the initial authorization code 160 in a message such as the Short Message Service (SMS) via the user software 15.

The user may address the message having the initial authorization code 160 to a portal authentication server 130. Utilizing the user interface 20 and the UE software 15, the user of UE 5 transmits the message with the code to a Short Message Service Center (SMSC) 125 in the service provider infrastructure 105. The SMSC 125 can be a network element in a mobile telephone network which delivers SMS messages.

The SMSC 125 forwards the message to the addressee which is the portal authentication server 130.

The portal authentication server 130 includes server software 135 that is configured to extract the initial authorization code 160 from the message sent by the user of the UE 5, and the server software 135 may be stored in the memory 150. Transmitting the message with the initial authorization code 160 to the portal authentication server 130 is a request to the portal authentication server 130 that the user of the UE 5 is asking for a temporary code to be generated. In order for the portal authentication server 130 to process the request from the user, the request must be sent from the UE 5 previously authenticated by the authentication center 110 of the service provider infrastructure 105. The server software 135 of the portal authentication server 130 is configured to determine whether the UE 5 has been properly authenticated to the service provider infrastructure 105, such as a wireless communication provider's network, by the authentication server 110 which utilized, e.g., the triplet authentication. Although the user may have various communication devices capable of transmitting the initial authorization code 160 to the portal authentication server 130, the server software 135 will only accept and process the request for the temporary generated code 160 from the UE 5. In response to the server software 135 determining that the UE 5 has been properly authenticated to the service provider infrastructure 105, the server software 135 of the portal authentication server 130 checks its own user database 155 in memory 150 to determine a correlation between the user's initial authorization code 160 in the message and a corresponding portal, such as a bank portal. The bank portal may be a bank's website for gaining access to the user's bank account. For example, the server software 135 may search the user's profile in the database 155 to find a match to the user's initial authorization code 160 in the message. The user may have many different initial authorization codes 160 that respectively are for different portals. The portal may be websites that require credentials to be input before the user can access a session on the website, and the user may have to input credential in a display box 500 shown in FIG. 5.

In response to the portal authentication server 130 correlating the code to the corresponding bank portal, the server software 135 of the portal authentication server 130 generates a temporary generated code 160 for the user. The server software 135 transmits the temporary generated code 165 to an application server 140, e.g., the server of a bank. The portal 145 of the application server 140 receives the temporary generated code 165. Also, the server software 135 transmits the temporary generated code in a message to the UE 5, and the server software 135 may transmit the temporary generated code 165 to the UE 5, e.g., via the SMSC 125. Although the user may have various communication devices capable of receiving the temporary generated code 165, the server software 135 is configured to only transmit the temporary generated code 165 to the UE 5 of the user which has been authenticated to the service provider infrastructure 105.

To gain access to the portal 145, user credentials need to be authenticated. The portal 145 may request input of a user identification (ID) and input of a pass code. In exemplary embodiments, the user can input his user identification (ID) such as a user name, and the user can input the temporary generated code 165 as the pass code in the display box 500 of FIG. 5. The portal 145 receives the temporary generated code 165 from the user. The portal 145 checks to determine whether the temporary generated code 165 has expired. For example, the temporary generated code has an expiration time, such as 15, 20, 25, 30, 35, or 45 minutes in which the temporary generated code 165 must be used to start a session before the temporary generated code 165 expires. Once the temporary generated code 165 expires, the temporary generated code 165 can no longer be utilized to gain access to the portal 145 of the application server 140.

The portal 145 determines whether the temporary generated code 165 input by the user properly matches the temporary generated code 165 received by the application server 140 from the portal authentication server 130. In response to a match of the temporary generated code 165 input by the user, the portal 145 allows the user to gain access to a session on the portal 145 and the session may, e.g., allow the user to access a user's credit card account.

In accordance with exemplary embodiments, the temporary generated code 165 is only operable for one session on the application server 140, and the temporary generated code 165 expires after each session. If the user of UE 5 desires another session on the application server 140, the user must request a new temporary generated code 165 as discussed herein. For each subsequent session on the application server 140, the user of UE 5 must continuously request a new temporary generated code 165.

Further regarding the expiration of the temporary generated code 165 at the preset time, the portal 145 is configured to recognize that the temporary generated code 165 will expire at a preset time. The preset time to expire may be based on the time of creation of the temporary generated code 165, and/or the preset time to expire may be set based on the time in which the temporary generated code 165 is received by the application server 140. For example, the temporary generate code 165 may expire 5, 10, 15, 20, 25, 30, 35, 40, and/or 45 minutes after the portal 145 receives the temporary generated code 165. If the user of UE 5 does not log in and input the temporary generated code 165 within the preset time, the temporary generated code 165 will expire and no longer be operable to access the user's account on the application server 140. Also, the temporary generated code 165 may have an embedded timer that causes the temporary generated code 165 to expire at the preset time; the temporary generated code 165 may corrupt itself such that the temporary generated code 165 is no longer useable and/or a script 175 embedded with the temporary generated code 165 may check with the internal clock of the application server 140 to determine that the preset time has arrived. At the preset time, the script 175 may instruct the portal 145 that the temporary generated code 165 has expired.

In the block diagram 100, the UE 5 is configured to receive, control, and process communications received from the authentication center 110, the SMSC 125, the portal authentication server 130, and the application server 140 via the network 120. The UE 5 includes one or more modules, applications, programs, circuits, interfaces, etc., to implement exemplary embodiments to process communications over the network 120.

The UE 5 may be representative of and contain all the software and/or hardware to function and operate as mobile communication devices, mobile telephones, landline telephones, smart telephones, soft telephones, Session Initiation Protocol (SIP) telephones, Voice over Internet Protocol (VoIP) telephones, personal digital assistants, and computers. Further, the UE 5, the portal authentication server 130, the authentication center 110, the SMSC 125, and the application server 140 may be representative of high speed computer processing devices including one or more processors configured to execute computer readable instructions stored in memory, e.g., a computer readable storage, and configured to implement the necessary operations, functions, methods, and logic to implement exemplary embodiments discussed herein. For example, the UE 5 may be representative of an IPHONE® by Apple®, a MOTOROLA® communication device, a BLACKBERRY® communication device by RIM, and any other kind of mobile communication device.

Further regarding the network 120, the network 120 may include circuit-switched and/or packet-switched technologies and devices, such as routers, switches, hubs, gateways, etc., for facilitating communications. The network 120 may include wireline and/or wireless components utilizing, e.g., IEEE 802.11 standards for providing over-the-air transmissions of communications. The network 120 can include IP-based networks for communication between a customer service center and clients/users. The network 120 can manage multiple accounts as established by particular users. These accounts may then be used to provide access to services as described herein.

Also, the network 120 may include wireline and/or wireless components utilizing standards, e.g., multimedia messaging services (MMS). The network 120 may include a multimedia messaging center (MMC), which implements the network side of multimedia messaging service (MMS) and makes it possible for an operator to offer multimedia messaging to mobile communication device users. The MMC is a highly flexible system, which can be adapted to the needs of the operator and the particular end users involved. The MMC manages different sources to/from mobile terminals, supporting a wide range of standard interfaces.

According to exemplary embodiments, the network 120 may facilitate transmission of media, e.g., images, video, data, multimedia messaging, etc., from content services provider systems to customers/users via devices. In exemplary embodiments, the network 120 can include a managed IP and/or wireless network administered by a service provider, which can control bandwidth and quality of service for the communications discussed herein. The network 120 may be implemented in a wireless fashion, e.g., using wireless protocols and technologies, such as WiFi, WiMax, BLUETOOTH, etc. The network 120 can also be a packet-switched network, such as a local area network, a wide area network, a metropolitan area network, an Internet network, or other similar types of networks. The network 120 may be a cellular communications network, a fixed wireless network, a wireless local area network (LAN), a wireless wide area network (WAN), a personal area network (PAN), a virtual private network (VPN), an intranet or any other suitable network, and the network 120 may include equipment for receiving and transmitting signals, such as a cell tower, a mobile switching center, a base station, base transceiver, and a wireless access point.

Figure 2:
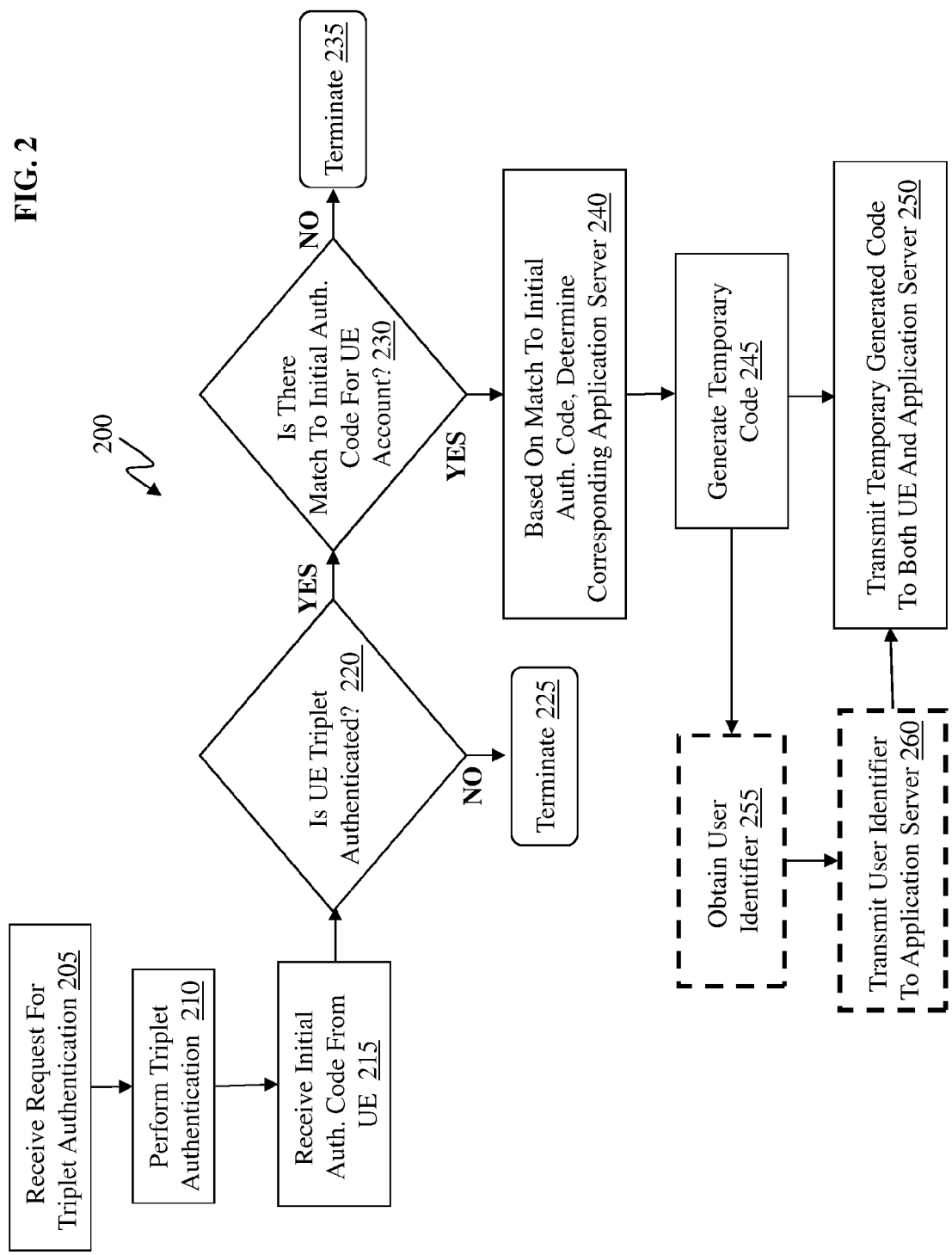
FIG. 2 illustrates a flow diagram in accordance with exemplary embodiments.

FIG. 2 illustrates a flow diagram 200 in accordance with exemplary embodiments. The UE 5 requests triplet authentication from the service provider infrastructure 105, and the authentication center 110 receives and processes the request for triplet authentication to the service provider infrastructure 105 at 205. The authentication center 110 performs the triplet authentication process with the UE 5 at 210.

In response to the completion of the triplet authentication between the UE 5 and the authentication center 110, the portal authentication server 130 receives an initial authorization code 160, e.g., a predefined 6 digit code, from the UE 5 at 215. For instance, the UE 5 can transmit the initial authorization code 160 in a message to the portal authentication server 130 via the SMSC 125, and the server software 135 is configured to extract the initial authorization code 160 from the message. The initial authorization code 160 is previously known to the user of UE 5 and the server software 135.

The server software 135 of the portal authentication server 130 determines whether the UE 5 has been triplet authenticated by the service provider infrastructure 105 at 220. In this example, the service provider infrastructure 105 is the service provider in which the UE 5 has subscribed to for communication services, such as wireless communication services. In response to the server software 135 of the portal authentication server 130 determining that the UE 5 has not been authenticated by the service provider infrastructure 105, the server software 135 terminates its communication with the UE 5 at 225. For example, the server software 135 may transmit a message to the UE 5 indicating that the UE 5 cannot access the services of the portal authentication server 130 and/or a message indicating that the UE 5 has not been properly triplet authenticated by the service provider infrastructure 105.

In response to the server software 135 of the portal authentication server 130 determining that the UE 5 has been authenticated by the service provider infrastructure 105, the server software 135 of the portal authentication server 130 determines whether there is a match to a user account in the user profile stored in the user database 155 that correlates to the initial authorization code 160 provided by the user at 230. For example, the server software 135 is configured to determine if there is a user account that corresponds to the initial authorization code 160, and the user account may be, e.g., the user's bank account at Bank of South. If it is determined that there is no match to the initial authorization code 160 provided by the user, the server software 135 terminates communication with the UE 5 at 235. Also, the server software 135 may transmit a message to the user of the UE 5 indicating that the initial authorization code 160 is incorrect. The server software 135 may also transmit a message to the UE 5 indicating that the user of the UE 5 needs to update the user profile, if the user feels there has been an error.

In response to the server software 135 determining that there is a match to the initial authorization code 160 in the database 155, the server software 135 determines the corresponding application server 240 that matches the initial authentication code 160 provided by the user of UE 5 at 240. The application server 240 may be hosted by fictitious Bank of the South where the user has a bank account.

In response to determining the corresponding application server 240 for the initial authorization code 160, the server application 135 generates the temporary generated code 165 at 245. The server application 135 may execute an algorithm that produces a random number, alphanumeric number, and/or symbols to be used as the temporary generated code 165. The server application 135 checks to ensure that the same temporary generated code 165 has not been generated twice for the initial authorization code 160 sent by the user of UE 5. Also, the server application 135 may check to ensure that the same temporary generated code 165 has not been previously transmitted to the application server 140. If the server software 135 determines that the same temporary generated code 160 has been generated or transmitted, the server software 135 creates a different temporary generated code 165.

The server software 135 of the portal authentication sever 130 transmits the temporary generated code 165 to both the UE 5 and the application server 140 at 250. The portal 145 of the application server 140 receives the temporary generated code 165 and sets the temporary generated code 165 to the user's bank account, so that the temporary generated code 165 is required to gain access to the user's bank account.

The portal 145 is configured to recognize that the temporary generated code 165 is from the portal authentication server 130. The portal 145 is configured to determine that the portal authentication server 130 corresponds to the user of UE 5 by performing a look up in the database 185.

Optionally, the server software 135 can use the initial authorization code 160 to search the database 155 to obtain the user identifier 170 that relates to the initial authorization code 160 of the user at 255. Optionally, the server software 135 of the portal authentication server 130 may transmit the user identifier 170 along with the temporary generated code 165 to the application server 140, so that the portal 145 can correspond the temporary generated code 165 to the user of the UE 5 at 260. The user identifier 170 is a secret identification known in advance by the server software 135 of the portal authentication server 130 and the portal 145 of the application server 140, and the user identifier 170 is utilized by the portal 145 to identify the user of UE 5 in the database 185. The portal 145 utilizes the user identifier 170 to locate, e.g., the user's bank account in memory 175 of the application server 140. In response to verifying that the secret user identifier 170 correlates to the user's bank account, the portal 145 sets the access pass code for the gaining access to the user's bank account as the temporary generated code 165.

With reference to FIG. 5, when the user is attempting to start a session on the application server 140, the portal 145 presents the user with the display box 500 on the display 35. The user of UE 5 may utilize the user interface 20 to input his pass code in the pass code box 510, and in response to the portal 145 confirming the temporary generated code 165 is correct, the user is granted access to the user account. Since the user identifier 170 has been transmitted to the application server 140 along with the temporary generated code 170, the portal 145 knows exactly who the user is and the exact user account that the temporary generated code 165 is for. Accordingly, the user of UE 5 may not be required to input a user name in the user name box 505, but the user may additionally input the user name in the user name box 505. The user name is previously known to both the user and the application server 140. The user name may have been created by the user at an earlier time.

In exemplary embodiments in which the user identifier 170 is not transmitted to the application server 140, the portal 145 previously knows that the UE 5 subscribes to services on the service provider infrastructure 105, and the portal 145 previously knows that a specific registered portal authentication server 130 is registered to the user of UE 5 out of numerous portal authentication servers 130. For example, the portal 145 knows the unique IP address for the specific registered portal authentication server 130 for the user of UE 5, and other predetermined users, is stored in the database 185 in memory 180. In exemplary embodiments, the temporary generated code services of the registered portal authentication server 130 may only be utilized by predetermined users having their respective UE 5 subscribed to the service provider infrastructure 105. When the temporary generated code 165 is transmitted from the registered portal authentication server 130 to the application server 140, the portal 145 automatically recognizes that only limited users can correspond to this specific registered portal authentication server 130, because this specific registered portal authentication server 130 is utilized only by a group of predetermined users. The predetermined users are identified with the specific registered portal authentication server 130 in the database 185. For the sake of explanation, the specific registered portal authentication server 130 represents a single portal authentication server 130 but in practice the specific registered portal authentication server 130 may represent any isolated group of specific registered portal authentication server 130.

Additionally, in exemplary embodiments, the owner, e.g., XYZ Wireless Internet, of the registered portal authentication server 130 and the owner of the application server 140 can set a security agreement that the temporary code generation services of the specific registered portal authentication server 130 only apply for the predetermined users of the application server 140. So when there are many different portal authentication servers 130, the specific registered portal authentication server 130 and/or partitions of the registered portal authentication server 130 may be configured to only communicate with the application server 140. As such, when the user of the UE 5 registers with the application server 140 to indicate the name of his service provider, the portal 145 automatically recognizes that temporary generated codes 165 are expected to be received only from the registered portal authentication server 130 for the user of UE 5 and/or any other users who have preregistered to indicate the same registered portal authentication server 130. In response to receiving the temporary generated code 165 from the registered portal authentication server 130, the portal 145 may parse the database 185 of predetermined users who correspond to the service provider infrastructure 105 for the registered portal authentication server 130. Within the preset time period, the portal 145 is waiting and expects to receive a log in request from one of the predetermined group of users in the database 185 although the portal does not know who the exact user is until the user logs in the temporary generated code 165. With reference to FIG. 5, if the user attempts to input credentials into the display box 500 when the user identifier 170 has not been provided to the application server 140, the user is required to input the user name in the user name box 505 along with the pass code so that the portal 145 can determine and identify that particular user out of the predetermined group of users registered to the specific registered portal authentication server 130. The portal 145 verifies both the user name and pass code which is the temporary generated code 165, and if the credentials are correct, the portal 145 grants access to a session for the user account. Although for explanatory purposes the registered portal authentication server 130 may be discussed as a single server 130 out of many different servers 130, it is understood that the registered portal authentication server 130 can represent numerous registered portal authentication servers 130 that have a specific security agreement with the owner, e.g., Bank of the South, of the application server 140.

Figure 3:
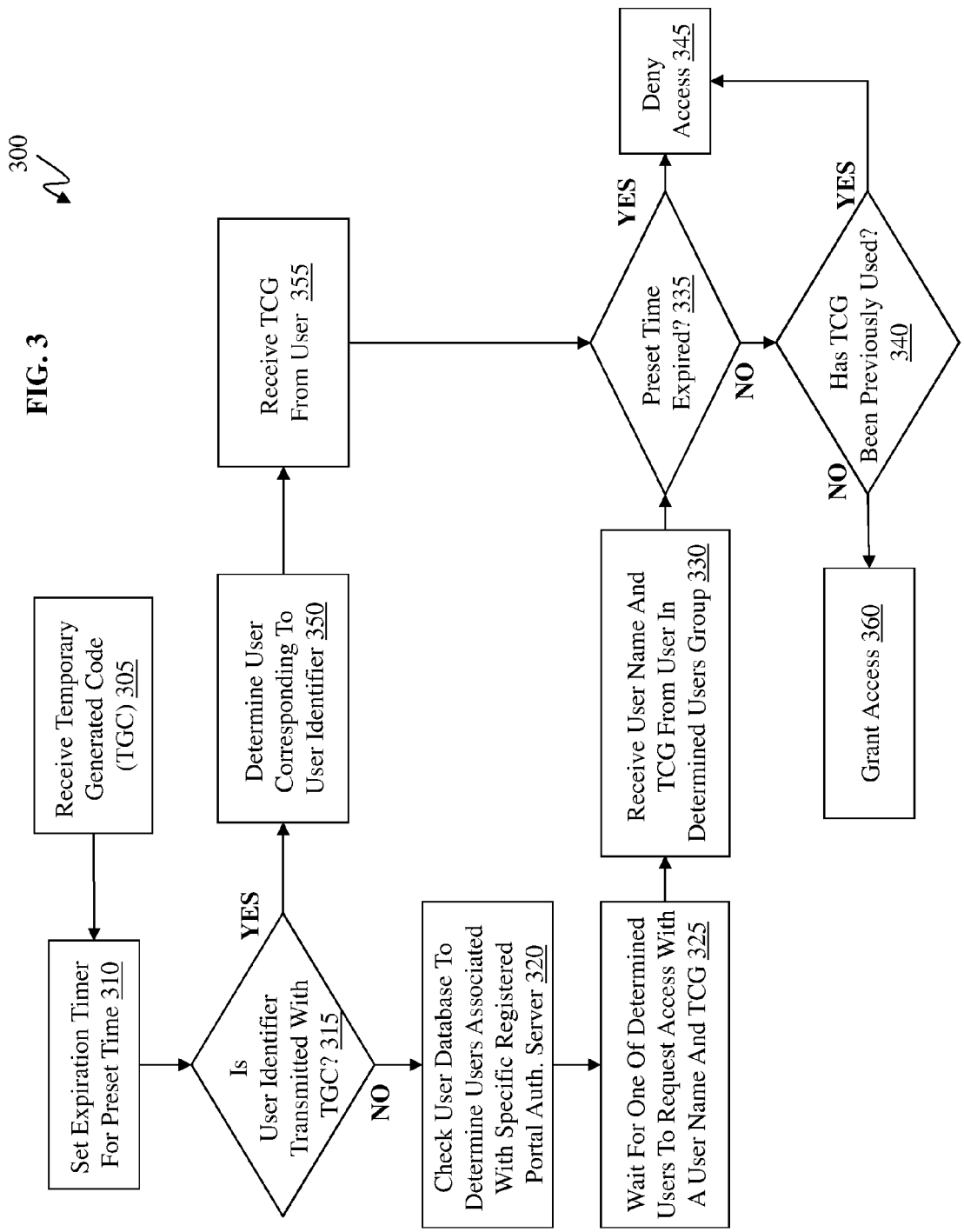
FIG. 3 illustrates a flow diagram in accordance with exemplary embodiments.

FIG. 3 illustrates a flow diagram 300 of utilizing temporary generated codes 165 in accordance with exemplary embodiments.

The application server 140 receives the temporary generated code 165 from the portal authentication server 130 at 305. The UE 5 also receives the temporary generated code 165 from the portal authentication server 130. The server software 135 is configured to send the temporary generated code 165 to the UE 5 that was confirmed as being triplet authenticated by the authentication center 110, and the server software 135 does not send the temporary generated code 165 to, e.g., any other addresses of the user and/or another communication device of the user that has not been triplet authenticated by the service provider infrastructure 105. The user is restricted from attempting to designate an address, subscriber number, and/or location different from the triplet authenticated UE 5 for the server software to transmits the temporary generated code 165.

The expiration timer for the temporary generated code is set by the portal authentication server 130 and/or the application server 140 at 310. For example, when application server 140 receives the temporary generated code 165, the portal 145 automatically sets an expiration timer to expire at a preset set time. For instance, after receiving the temporary generated code 165, the portal 145 of the application server 140 can automatically set time for the temporary generated code 165 to expire, e.g., in 5, 10, 15, 20, 25, 30, 35, 40, 45 minutes and/or 1, 2, 3, 4, 5, and 6 hours.

Also, the portal authentication server 130 may set the expiration timer with the preset time to expire for the temporary generated code 165. For example, when the portal authentication server 130 transmits the temporary generated code 165, the portal authentication server 130 may also transmit the script 175 to the application server 140. The server software 135 of the portal authentication server 130 may determine when the temporary generated code 165 should expire based on the execution of the script 175 on the application server 140. When the script 175 executes on the application server 140, the script 175 can cause the preset time to be set for the temporary generated code 165, and/or the script 175 can instruct the portal 145 to set the preset time for temporary generated code 165 to expire. The expiration of the preset time can be determined based on an internal clock of the application server 140. At certain increments prior to the expiration of the temporary generated code 165, the portal 145 may transmit reminders to the UE 5 to indicate that the temporary generated code 165 is about to expire.

Further regarding the script 175, the script 175 may be generated by the portal authentication server 130 and/or may be extracted from the memory 150. There may be various scripts 175 generated by the server software 135 and/or extracted from the memory 150 based on the length of time in which the temporary generated code 165 will be in effect before it expires. Once the temporary generated code 165 expires, a new temporary generated code 165 will need to be generated by the server software 135 for the user to access the user's account on the application server 140. For example, when the temporary generated code 165 expires and the user inputs the expired temporary generated code 165 as a pass code to log in and request access to the user's account, the portal 145 denies the request for a session. The preset time in which the temporary generated code 175 expires may be set based on predefined rules. The rules may include continuously reducing the length of time for expiration based on how long since the user of UE 5 last made a request to the portal authentication server 130 for the temporary generated code 165 with the specific initial authorization code 160.

The portal 145 of the application sever 140 checks to determine if the user identifier 170 is transmitted from the portal authentication server 130 at 315. The user identifier 170 is specific to a particular user and allows the portal 145 to determine the particular user in the database 185.

In response to not receiving the user identifier 170, the portal 145 checks the user database 185 to determine if there is a group of predetermined users who are associated with the specific registered portal authentication server 130 at 320. For example, since the portal 145 received the temporary generated code 165 without receiving the user identifier 170, the portal 145 recognizes that there has to only be certain users with user accounts that correlate to the specific registered portal authentication 130. When no user identifier 170 is transmitted, the specific registered portal authentication 130 must be registered in advance and the user, which may include other predetermined users, must indicate that the particular specific portal authentication server 130 is his/her specific registered portal authentication server 130. So even if there are a plurality of other portal authentication servers 130 but they are not the specific registered portal authentication sever 130 in which the user is registered to, the other portals will need to transmit the user identifier 170 along with the temporary generated code 165. However, since the specific registered portal authentication server 130 only has a limited number of users who have registered to it, the portal 145 can determine who those limited users are.

The portal 145 waits for someone out of the group of predetermined users registered to the specific registered portal authentication server 130 to request for access to their respective user account with a user name and the temporary generated code 165 at 325. The portal 145 of the application server 140 receives an input of a user name and temporary generated code 165 as the pass code from one of the predetermined users determined to be in the group related to the specific registered portal authentication 130 at 330. Since the temporary generated code 165 sent without the user identifier 170 could be for any user in the group of predetermined users who correspond to the specific registered portal authorization server 130, the user name allows the portal 145 to determine which particular user account the user is logging into when the user inputs the temporary generated code 165 as the pass code. The flow branches to block 335 discussed below.

If portal 145 determines that the user identifier 170 is transmitted with the temporary generated code 165, the portal 145 can determine the user associated with the user identifier 170 in the database 185 at 350. The portal 145 associates the identified user with the received temporary generated code 165 and waits the identified user to log in with the temporary generated code 165.

The portal 145 receives an input of the temporary generated code 165 by the user, e.g., utilizing the user interface 20 at 355. The user can input the temporary generated code 165 with and/or without a user name because the portal has determined that there is only one user who corresponds to the user identifier 170.

Now regarding block 335, the portal 145 determines whether the preset time has expired at 335. If expired, the portal 145 denies the user access to the user account on the application server 140 even if the credentials match at 345.

If the temporary generated code 165 is not expired, the portal 145 determines whether the temporary generated code 165 has been previously input by a user at 340.

If the temporary generated code 165 has been previously input into the portal 145, the portal 145 denies access to a session on the application server 140 even if the credential are match at 345.

If the temporary generated code 165 has not been previously input into the portal 145, the portal 145 allows access to a session on the application server 140 at 360.

In exemplary embodiments, the temporary generated code 165 may only be used once to gain access to the user account on the application server 140. After the temporary generated code 165 has been input by the user of the UE 5 to open a session for the user account, that same temporary generated code 165 cannot be utilized again to open another session for the user account because the portal 145 denies access. For example, if the user of the UE 5 has ended the session for the user account on the application server 140 in which the temporary generated code 165 was input as the pass code, and if the user of the UE 5 wants to access the user account again on the application server 140, e.g., in the same day, 5 minutes later, 5 seconds later, the next day, and/or at any time after the previous session for the user account, the user of the UE 5 must utilize a new temporary generated code 165. So, the UE 5 must be triplet authenticated by the authentication center 110, and the user of UE 5 has to request for authentication by the portal authentication server 130 to receive a new temporary generated code 130. In response to the portal authentication server 130 authenticating the user of UE 5 and generating the new temporary generated code 130 as discussed herein, the portal authentication server 130 transmits the new temporary generated code 165 to the UE 5 and the application server 140. Now, the user of UE 5 can utilize the new temporary generated code 165 to access a session for the user account because the old temporary generated code 165 cannot be used again.

Turning back to FIG. 1, in accordance with exemplary embodiments, the portal authentication server 130 is configured to repeatedly generate new temporary generated codes 165 at the expiration of previous temporary codes by receiving the initial authorization code 160 from the user utilizing the UE 5. For example, the user of UE 5 can have many different initial authorization codes 160, e.g., 20. Each of the 20 different initial authorization codes 160 respectively correspond to only one user account out of a plurality of user accounts for the user utilizing the UE 5, and the portal authentication server 130 determines the correct user account in the database 155 that corresponds to each of the 20 different initial codes 160. Each of the user accounts is respectively for different application servers 140, so if there are 20 different user accounts they each would respectively correspond to one of the 20 different application servers 140. The portal authentication server 130 obtains the individual IP address for each of the application servers 140 from the database 155 to be able to transmit the temporary generated codes 165. The portal authentication server 130 generates 20 different temporary generated codes 165 each respectively corresponding to one of the 20 different application servers 140. The portal authentication server 130 transmits the 20 different temporary generated codes 165 to each respective ones of the application servers 140 and to the UE 5. For instance, the portal authentication server 130 may transmit the corresponding initial authorization code 160 for the respective ones of the 20 different temporary generated codes 165 back to the UE 5 so that the user can recognize which temporary generated code 165 corresponds to the individual ones of the 20 application servers 140. Also, the portal authentication server 130 can transmit the respective 20 temporary generated codes 165 each in a reply message that corresponds to the request message with the initial authorization code 160 that was sent by the UE 5. In exemplary embodiments, the initial authorization code 160 represents numerous different initial authorization codes 160, the temporary generated code 165 represents numerous different temporary generated codes 165, the user identifiers 170 represent numerous user identifiers 170, that can utilized by different portal authentication servers 130 and different application servers 140.

FIG. 4 illustrates a block diagram 400 of triplet authentication that may be utilized in exemplary embodiments.

Whenever a mobile subscriber (MS), for example the UE 5, requests access to a network such as the service provider infrastructure 105, the network must authenticate the UE 5. Authentication verifies the identity and validity of the SIM card 30 to the service provider infrastructure 105 network and ensures that the subscriber is authorized access to the network.

In, e.g., Global System for Mobile communications (GSM), encryption refers to the process of creating authentication and ciphering cryptovariables using a special key and an encryption algorithm. Ciphering refers to the process of changing plaintext data into encrypted data using a special key and a special encryption algorithm. Transmissions between the UE 5 and a base transceiver station (BTS) 400 on the Um link, which is an air interface, are enciphered.

A Ki is the individual subscriber authentication key. It is a 128-bit number that is paired with an international unique number of the mobile user (IMSI) when the SIM card 30 is created. The Ki is only stored on the SIM card 30 and at the Authentication Center (AuC) 110. The Ki should never be transmitted across the network on any link.

A RAND is a random 128-bit number that is generated by the AuC 110 when the network requests to authenticate a subscriber, such as the user of UE 5. The RAND is used to generate the Signed Response (SRES) and Kc cryptovariables.

The SRES is a 32-bit cryptovariable used in the authentication process. The UE 5 is challenged by being given the RAND by the service provider infrastructure 105 network, and the SRES is the expected correct response. The SRES is never passed on the Um (Air) interface. The SRES is kept at the mobile switching center (MSC)/visitor location register (VLR) 405, which performs the authentication check.

An A3 algorithm computes a 32-bit Signed Response (SRES). The Ki and RAND are inputted into the A3 algorithm and the result is the 32-bit SRES. The A3 algorithm resides on the SIM card 30 and at the AuC 110. An A8 algorithm computes a 64-bit ciphering key (Kc). The Ki and the RAND are inputted into the A8 algorithm and the result is the 64-bit Kc. The A8 algorithm resides on the SM card 30 and at the AuC 110. The Kc is the 64-bit ciphering key that is used in the A5 encryption algorithm to encipher and decipher the data that is being transmitted on the Um interface. The A5 encryption algorithm is used to encipher and decipher the data that is being transmitted on the Um interface. The Kc and the plaintext data are inputted into the A5 algorithm and the output is enciphered data. The A5 algorithm is a function of the user equipment (UE) 5 and not a function of the SIM card 30. The BTS 415 also makes use of the A5 algorithm.

The RAND, SRES, and Kc together are known as the Triplets. The AuC 110 will send these three cryptovariables to the requesting MSC/VLR 405 so it can authenticate and encipher.

The following is an example of the triplet authentication process. When the UE 5 requests access to the as the service provider infrastructure 105 network, the MSC/VLR 405 will normally require the UE 5 to authenticate. The UE 5 transmits the IMSI, which is the serial number of the SIM card 30, obtained from the SIM card 30 to the MSC 405. The MSC 405 will forward the IMSI to the HLR 410 and requests authentication Triplets.

When the HLR 410 receives the IMSI and the authentication request, the HLR 410 first checks its database to make sure the IMSI is valid and belongs to the service provider infrastructure 105 network. Once it has accomplished this, the HLR 410 will forward the IMSI and authentication request to the Authentication Center (AuC) 110.

The AuC 110 will use the IMSI to look up the Ki associated with that IMSI. The Ki is the individual subscriber authentication key. It is a 128-bit number that is paired with an IMSI when the SIM card 30 is created. The Ki is only stored on the SIM card 30 and at the AuC 110. The AuC 110 will also generate a 128-bit random number called the RAND.

The RAND and the Ki are inputted into the A3 encryption algorithm of the AuC 110. The output is the 32-bit Signed Response (SRES). The SRES is essentially the "challenge" sent to the UE 5 when authentication is requested.

The RAND and Ki are input into the A8 encryption algorithm of the AuC 110. The output is the 64-bit Kc. The Kc is the ciphering key that is used in the A5 encryption algorithm to encipher and decipher the data that is being transmitted on the Um interface.

The RAND, SRES, and Kc are collectively the triplets. The AuC 110 may generate many sets of triplets and send them to the requesting MSC/VLR 405. This is in order to reduce the signaling overhead that would result if the MSC/VLR 405 requested one set of triplets every time it wanted to authenticate the UE 5. It should be noted that a set of triplets is unique to one IMSI, and the triplets it can not be used with any other IMSI.

Once the AuC 110 has generated the triplets, or sets of triplets, it forwards them to the HLR 410. The HLR 410 subsequently sends them to the requesting MSC/VLR 405. The MSC 405 stores the Kc and the SRES but forwards the RAND to the UE 5 and orders it to authenticate.

The UE 5 has the Ki stored on the SIM card 30. The A3 and A8 algorithms also reside on the SIM card 30. The RAND and Ki are inputted into the A3 and A8 encryption algorithms to generate the SRES and the Kc respectively. The UE 5 stores the Kc on the SIM card 30 and sends the generated SRES back to the service provider infrastructure 105 network. The MSC 405 receives the UE 5 generated SRES and compares it to the SRES generated by the AuC 110. If they match, then the UE 5 is authenticated.

It is understood by one skilled in the art that each element such as the devices, user equipment, software, cards, modules, systems, interfaces, adapters, networks, controllers, computers, infrastructure, etc., described in the present disclosure contains all the necessary hardware, software, and/or firmware to operate and function as discussed herein in accordance with exemplary embodiments.

FIG. 6 illustrates an example of a computer 600 having one or more elements that may be utilized in implementing the UE 5, application server 140, and the service provider infrastructure 105 including the authentication center 110, the SMSC 125, the portal authentication server 130, the MSC 105, the BTS 415 and the HLR 410 in accordance with exemplary embodiments. The computer 600 includes, but is not limited to, PCs, workstations, systems, laptops, PDAs, palm devices, servers, mobile devices, communication devices, cell phones, computer systems, set top boxes (STB), televisions (TV), game consoles, MP3 players, and the like. The computer 600 may include processors 610, memory 620, and one or more input and/or output (I/O) 670 devices (or peripherals) that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in the memory 620. The processor 610 can be virtually any custom made or commercially available processor, a central processing unit (CPU), a data signal processor (DSP), or an auxiliary processor among several processors associated with the computer 600, and the processor 610 may be a semiconductor based microprocessor (in the form of a microchip) or a macroprocessor.

The memory 620 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.), which may be considered as a computer readable medium. Moreover, the memory 620 may incorporate electronic, magnetic, optical, and/or other types of storage media. Note that the memory 620 can have a distributed architecture, where various components are situated remote from one another, but can be accessed by the processor 610.

The software in the memory 620 may include one or more separate programs, each of which comprises an ordered listing of executable instructions for implementing logical functions. In the example illustrated in FIG. 6, the software in the memory 620 includes a suitable operating system (O/S) 650, compiler 640, source code 630, and one or more applications 660 (or modules) of the exemplary embodiments.

The operating system 650 controls the execution of other computer programs, and provides scheduling, input-output control, file and data management, memory management, and communication control and related services. It is contemplated by the inventors that the application 660 for implementing exemplary embodiments is applicable on all other commercially available operating systems.

The application 660 may be a source program, executable program (object code), script, or any other entity comprising a set of instructions to be performed. When a source program is to be executed, then the program is usually translated via a compiler (such as the compiler 640), assembler, interpreter, or the like, which may or may not be included within the memory 620, so as to operate properly in connection with the O/S 650. Furthermore, the application 660 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 670 may include input devices such as, for example but not limited to, a mouse, keyboard, scanner, microphone, remote controller, camera, biometric input device(s), a vibrator device for non-audible alert, etc. Furthermore, the I/O devices 670 may also include output devices, for example but not limited to, a printer, display, speaker, etc. Also, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 include may include modems, gateways, receivers, transmitters, transceivers, etc. for communicating over a communications network.

When the computer 600 is in operation, the processor 610 is configured to execute software stored within the memory 620, to communicate data to and from the memory 620, and to generally control operations of the computer 600 pursuant to the software. The application 660 and the O/S 650 are read, in whole or in part, by the processor 610, perhaps buffered within the processor 610, and then executed.

When the application 660 is implemented in software, it should be noted that the application 660 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 660 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, computer programs tangibly embodied on a computer-readable medium can be stored, communicated, propagated, or transported for use by or in connection with the instruction execution system, apparatus, or device.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 660 is implemented in hardware, the application 660 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The SIM card 30 is a removable Subscriber Identity Module (SIM) that securely stores the service-subscriber key (IMSI) used to identify a subscriber on mobile telephony devices (such as computers and mobile phones). The SIM card 30 allows users to change phones by simply removing the SIM card from one mobile phone and inserting it into another mobile phone or broadband telephony device. The SIM card 30 usually contains its unique serial number, international unique number of the mobile user (IMSI), security authentication and ciphering information, temporary information related to the local network including a temporary local id that has been issued to the user, list of the services the user has access to and two passwords, e.g., regular PIN and unblocking PUK.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer such as the computer 600, the computer becomes an apparatus for practicing the exemplary embodiments. The exemplary embodiments can also be in the form of computer program code, for example, whether stored in a storage medium, loaded into and/or executed by a computer. When the computer program code is loaded into an executed by a computer, the computer becomes an apparatus for practicing the exemplary embodiments. When implemented on a general-purpose microprocessor, the computer program code segments configure the microprocessor to create specific logic circuits. It is understood that computer program code can be transmitted over some transmission medium, loaded into and/or executed by a computer, or transmitted over some transmission medium, such as over electrical wiring or cabling, through fiber optics, or via electromagnetic radiation.

While features have been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the present disclosure without departing from the essential scope thereof. Therefore, it is intended that the present disclosure not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for providing temporary generated codes for portal authentication, the method comprising:

in response to triplet authentication of a communication device to a service provider network for communications, receiving at a portal authentication server an initial code from a user utilizing the communication device to request a temporary generated code for a user account for a bank portal;

verifying by the portal authentication server the triplet authentication of the communication device to the service provider network;

in response to proper verification, determining by the portal authentication server whether there is a user account match to the initial code which corresponds to the bank portal;

in response to determining the user account match of the bank portal, determining by the portal authentication server a corresponding application server of a bank based on the initial code and the user account match to the bank portal of the application server;

in response to the user account match to the bank portal and determining the application server of the bank having the user account match to the bank portal, generating by the portal authentication server the temporary generated code to access the application server of the bank;

transmitting the temporary generated code from the portal authentication server to both the application server and the communication device;

wherein receipt of the temporary generated code by the application server causes the application server of the bank to set the temporary generated code to the user account making the temporary generated code required to gain access to the user account;

wherein the temporary generated code is set to expire at a preset time;

wherein the temporary generated code is generated to allow the user access to a single session on the application server of the bank for the bank portal; and wherein the temporary generated code is generated to expire after the temporary generated code is input to access the single session on the application server;

before the start of the single session, setting by the application server of the bank the temporary generated code to expire according to a time when the application server of the bank receives the temporary generated code from the portal authentication server;

checking by the portal authentication server to ensure that a code matching the temporary generated code has not been previously transmitted to the application server of the bank; and when the portal authentication server determines that the code matching the temporary generated code has already been generated, creating by the portal authentication server a different temporary generated code for the application server of the bank.

2. The method of claim 1, wherein for each respective subsequent session on the application server, the portal authentication server must create new respective temporary generated codes; and wherein for the user to access respective subsequent sessions on the application server, the portal authentication server transmits the new respective temporary generated codes to both the application server and the communication device.

3. The method of claim 1, wherein to allow access to each subsequent session accessing the user account requires a new temporary generated code to be generated by the portal authentication server;

wherein the new temporary generated code is different from any previous temporary generated code; and wherein the new temporary generated code is transmitted to both the application server and the communication device.

4. The method of claim 1, wherein the portal authentication server sets the temporary generated code to expire at the preset time by utilizing a script associated with the temporary generated code;

wherein the script causes the application server to deny access to the session at the preset time; and wherein the portal authentication server transmits the script to the application server along with the temporary generated code.

5. The method of claim 1, wherein receiving the temporary generated code from the portal authentication server causes the application server to start an expiration timer that causes the temporary generated code to expire at the preset time.

6. The method of claim 1, wherein the temporary generated code is generated by the portal authentication server to cause the application server to set an expiration timer at the time of receiving the temporary generated code, the expiration timer being associated with the temporary generated code to cause the temporary generated code to expire at the preset time.

7. The method of claim 6, wherein the temporary generated code is generated by the portal authentication server to cause the application server to deny access to the user account when the temporary generated code has previously been used for the single session.

8. The method of claim 7, wherein the portal authentication server is operative to repeatedly generate new temporary generated codes at the expiration of previous temporary codes by receiving the initial code from the user utilizing the communication device.

9. The method of claim of claim 1, wherein when the portal authentication server receives from the communication device a different initial code not being the initial code, the portal authentication server searches to locate a different user account; and wherein in response to the portal authentication server locating the different user account, the portal authentication server determines a different application server that corresponds to the different user account.

10. The method of claim 9, wherein the portal authentication server generates a different temporary generated code; and wherein the portal authentication server transmits the different temporary generated code to both the communication device and the different application server, to allow the user of the communication device to access a different session on the different application server.

11. The method of claim of claim 1, wherein the portal authentication server is operative to receive a plurality of distinct initial codes from the communication device of the user;

wherein the portal authentication server is operative to determine a plurality of different application servers that respectively correspond to each of the plurality of distinct initial codes;

wherein the portal authentication server is operative to generate a plurality of distinct temporary generated codes each respectively corresponding to the plurality of different application servers; and wherein the portal authentication server is operative to transmit the plurality of distinct temporary generated codes to the respective plurality of different application servers and to the communication device of the user.

12. An apparatus for providing temporary generated code services for portal authentication, the apparatus comprising:

memory comprising computer-executable instructions for providing the temporary generated code services; and a processor executing the computer-executable instructions, the computer-executable instructions, when executed by the processor, cause the processor to perform operations comprising:

in response to triplet authentication of a communication device to a service provider network for communications, receiving an initial code from a user utilizing the communication device to request a temporary generated code for a user account for a bank portal;

verifying the triplet authentication of the communication device to the service provider network;

in response to proper verification, determining whether there is a user account match to the initial code which corresponds to the bank;

in response to determining the user account match of the bank portal, determining a corresponding application server of a bank based on the initial code and the user account match to the bank portal of the application server;

in response to the user account match to the bank portal and determining the application server of the bank having the user account match to the bank portal, generating a temporary generated code to access the application server of the bank; and transmitting the temporary generated code to both the application server and the communication device;

wherein receipt of the temporary generated code by the application server causes the application server of the bank to set the temporary generated code to the user account making the temporary generated code required to gain access to the user account;

wherein the temporary generated code is set to expire at a preset time;

wherein the temporary generated code is generated to allow the user access to a single session on the application server;

wherein the temporary generated code is generated to expire after the temporary generated code is input to access the single session on the application server; and wherein before the start of the single session, the application server of the bank sets the temporary generated code to expire according to a time when the application server of the bank receives the temporary generated code from the processor; checking to ensure that a code matching the temporary generated code has not been previously transmitted to the application server of the bank; and when the processor determines that the code matching the temporary generated code has already been generated, creating a different temporary generated code for the application server of the bank.

13. The apparatus of claim 12, wherein for each respective subsequent session on the application server, the processor must create new respective temporary generated codes; and
wherein for the user to access respective subsequent sessions on the application server, the processor transmits the new respective temporary generated codes to both the application server and the communication device.

14. The apparatus of claim 12, wherein to allow access to each subsequent session accessing the user account requires a new temporary generated code to be generated by the processor;
wherein the new temporary generated code is different from any previous temporary generated code; and
wherein the new temporary generated code is transmitted to both the application server and the communication device.

15. The apparatus of claim 12, wherein the processor sets the temporary generated code to expire at the preset time by utilizing a script associated with the temporary generated code;
wherein the script causes the application server to deny access to the session at the preset time; and
wherein the processor transmits the script to the application server along with the temporary generated code.

16. The apparatus of claim 12, wherein receiving the temporary generated code from the processor causes the application server to start an expiration timer that causes the temporary generated code to expire at the preset time.

17. The apparatus of claim 12, wherein the temporary generated code is generated by the processor to cause the application server to set an expiration timer at the time of receiving the temporary generated code, the expiration timer being associated with the temporary generated code to cause the temporary generated code to expire at the preset time.

18. The apparatus of claim 17, wherein the temporary generated code is generated by the processor to cause the application server to deny access to the user account when the temporary generated code has previously been used for the single session.

19. The apparatus of claim 18, wherein the processor is operative to repeatedly generate new temporary generated codes at the expiration of previous temporary codes by receiving the initial code from the user utilizing the communication device.

20. A computer program product, tangibly embodied on a computer readable memory, for providing temporary generated codes for authentication, the computer program product including instructions that, when executed by a computer, cause the computer to perform operations comprising:
in response to triplet authentication of a communication device to a service provider network for communications, receiving an initial code from a user utilizing the communication device to request a temporary generated code for a user account for a bank portal;
verifying the triplet authentication of the communication device to the service provider network;
in response to proper verification, determining whether there is a user account match to the initial code which corresponds to the bank portal;
in response to determining the user account match of the bank portal, determining a corresponding application server of a bank based on the initial code and the user account match to the bank portal of the application server;
in response to the user account match to the bank portal and determining the application server of the bank having the user account match to the bank portal, generating a temporary generated code to access the application server of the bank;
transmitting the temporary generated code to both the application server and the communication device;
wherein receipt of the temporary generated code by the application server causes the application server of the bank to set the temporary generated code to the user account making the temporary generated code required to gain access to the user account;
wherein the temporary generated code is set to expire at a preset time;
wherein the temporary generated code is generated to allow the user access to a single session on the application server; and
wherein the temporary generated code is generated to expire after the temporary generated code is input to access the single session on the application server;
before the start of the single session, setting by the application server of the bank the temporary generated code to expire according to a time when the application server of the bank receives the temporary generated code from the computer; checking to ensure that a code matching the temporary generated code has not been previously transmitted to the application server of the bank; and when determined that the code matching the temporary generated code has already been generated, creating a different temporary generated code for the application server of the bank.

* * * * *